United States Patent
Shvets et al.

(10) Patent No.: US 12,487,239 B2
(45) Date of Patent: Dec. 2, 2025

(54) BIOCHEMICAL PROBES ATTACHED TO EPOXY-BASED RESINS

(71) Applicant: IDEXX LABORATORIES, INC., Westbrook, ME (US)

(72) Inventors: Alexei Boris Shvets, Gorham, ME (US); Darrin Leighton Ramsdell, Portland, ME (US); Michelle M. Straub, Yarmouth, ME (US); Yerramilli V. S. N. Murthy, Scarborough, ME (US); Phillip Sheldon Smith, Gorham, ME (US); Anne Catherine Fitzpatrick, Portland, ME (US)

(73) Assignee: IDEXX LABORATORIES, INC., Westbrook, ME (US)

( * ) Notice: Subject to any disclaimer, the term of this patent is extended or adjusted under 35 U.S.C. 154(b) by 243 days.

(21) Appl. No.: 17/681,973

(22) Filed: Feb. 28, 2022

(65) Prior Publication Data

US 2022/0283159 A1 Sep. 8, 2022

Related U.S. Application Data

(60) Provisional application No. 63/288,018, filed on Dec. 10, 2021, provisional application No. 63/155,472, filed on Mar. 2, 2021.

(51) Int. Cl.
*G01N 33/569* (2006.01)
*G01N 33/53* (2006.01)

(52) U.S. Cl.
CPC ... *G01N 33/56911* (2013.01); *G01N 33/5308* (2013.01); *G01N 2800/26* (2013.01)

(58) Field of Classification Search
None
See application file for complete search history.

(56) References Cited

U.S. PATENT DOCUMENTS

| | | | | |
|---|---|---|---|---|
| 4,839,275 A | * | 6/1989 | Weil | A61K 39/00 530/395 |
| 6,719,983 B2 | * | 4/2004 | Norris | G11B 7/00772 424/234.1 |
| 8,877,892 B2 | * | 11/2014 | Gee | C08B 37/0021 530/340 |
| 10,393,726 B2 | | 8/2019 | Soper et al. | |
| 2005/0272049 A1 | | 12/2005 | Banerjee et al. | |
| 2010/0075438 A1 | | 3/2010 | Ho et al. | |
| 2010/0256006 A1 | * | 10/2010 | Kodadek | G01N 33/54386 506/18 |
| 2014/0274778 A1 | | 9/2014 | Tsao et al. | |
| 2016/0338342 A1 | * | 11/2016 | Whitney | A01N 1/021 |
| 2018/0187257 A1 | | 7/2018 | Soper et al. | |
| 2018/0335423 A1 | * | 11/2018 | Yerramilli | A61P 13/12 |
| 2019/0307843 A1 | * | 10/2019 | Bartizal | A61K 9/0019 |
| 2019/0346422 A1 | | 11/2019 | Soper et al. | |
| 2019/0369091 A1 | * | 12/2019 | Tsao | G01N 33/545 |
| 2019/0376967 A1 | * | 12/2019 | Elsemore | G01N 33/56966 |

FOREIGN PATENT DOCUMENTS

| | | | | |
|---|---|---|---|---|
| CN | 102250869 | * | 5/2011 | Y02P 20/50 |
| CN | 102250869 A | | 11/2011 | |
| EP | 3307867 B1 | | 12/2020 | |

OTHER PUBLICATIONS

International Search Report and Written Opinion issued in International Application No. PCT/US2022/018077 as filed on Feb. 28, 2022, and mailed on Jun. 30, 2022.
The English translation of CN102250869A is enclosed.
International Search Report and Written Opinion issued in International Application No. PCT/US2022/018077 dated Oct. 12, 2024.

* cited by examiner

*Primary Examiner* — Jana A Hines
*Assistant Examiner* — Khatol S Shahnan Shah
(74) *Attorney, Agent, or Firm* — Parker Poe Adams & Bernstein, LLP; Paul E. Dietze (57) ABSTRACT

The present invention is directed to a method for making a solid substrate for conducting biological and chemical assays and to the solid substrate made by the method.

26 Claims, 1 Drawing Sheet

BIOCHEMICAL PROBES ATTACHED TO EPOXY-BASED RESINS

CROSS-REFERENCE TO RELATED APPLICATIONS

This application claims the benefit of U.S. Provisional Application No. 63/288,018 as filed on Jan. 17, 2021, and U.S. Provisional Application No. 63/155,472 as filed on Mar. 4, 2021, the entire contents of which are incorporated herein.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

The present invention is directed to a method for making a solid substrate for conducting biological and chemical assays and to the solid substrate made by the method. In particular, solid substrates for use in multiplex bioassays.

DESCRIPTION OF RELATED ART

Arrays for biological and chemical analysis can be created by attaching probe molecules to a solid substrate that has a surface comprising a resin material, such as a functionalized epoxy resin. The arrays permit rapid screening of a large number of biomolecules, such as nucleic acids and proteins, in very small sample volumes. For example, particles, known as microspheres or microbeads, bearing identifiable labels and/or markings, called barcoded microbeads, have been used in parallel multiplex analyses for the identification of disease-related targets, toxin-related targets, gene-related targets, and the like. The microbeads have a resin coating on their surface that is conjugated to one or more probe molecules that have an affinity for, and/or an ability to interact with, one or more specific target molecules. Each probe molecule is attached to a separate bead that is coded so as to be uniquely identifiable. In an assay, the microbead is contacted with a sample and different target molecules in the sample become bound to the microbead that has the corresponding probe molecule conjugated to it. The barcode enables identification of the target.

Microbead assays are now an important tool in biologicals assays and diagnostics. Microbead-based technologies represent an elegant and versatile approach for conducting highly parallel quantitative multiparameter assays. They form the basis for a variety of techniques for detecting and quantifying nucleic acids and proteins in a sample.

Epoxy-based resins have been used as the coating material to which the probe molecule is attached. Attaching the probe molecule to the surface of the epoxy-based resin, however, requires the additional step of having to first functionalize the surface of the resin. U.S. Pat. No. 9,255,922 discloses a substrate, such as a microbead or micro pellet, coated with an epoxy-based resin to which a probe molecule is attached. The patent teaches that epoxy-based resins are hydrophobic, which presents a limitation to many biological applications, so that the epoxy-based resin must be modified with an additional functional monomer before the probe molecule can be efficiently attached to the resin. Thus, after the epoxy-based resin is formed (or while the epoxy-based resin is being formed), the epoxy-based resin needs to be contacted with an additional functional monomer to functionalize the epoxy-based resin so that the biomolecule probe can be efficiently attached to the surface of the epoxy-based resin. This additional step of contacting the epoxy resin with a functional monomer is laborious and time consuming.

There is a need in the art, for simplified methods for making substrates that have a surface comprising an epoxy-based resin to which a biomolecule probe can be efficiently attached. The inventors have unexpectedly discovered that a biomolecule probe can be efficiently attached to a substrate coated with an epoxy-based resin without having to first functionalize the epoxy-based resin with an additional functional monomer.

These and other features and advantages of the present invention will become apparent from the remainder of the disclosure, in particular the following detailed description of the preferred embodiments, all of which illustrate by way of example the principles of the invention.

Citation of any reference in this application is not to be construed that such reference is prior art to the present application.

SUMMARY OF THE INVENTION

The invention is directed to a substrate for biological analysis and a method for making the substrate for biological analysis. The substrate for biological analysis comprises an epoxy-based resin having a biomolecule probe that is directly bonded to the polymerized resin.

The substrate for biological analysis is prepared by:
(i) providing a substrate that has a surface comprising an epoxy-based resin and
(ii) contacting a biomolecule probe with the epoxy-based resin so that the biomolecule probe bonds directly to the epoxy-based resin.

The invention is also directed to a method of assaying for the presence of an analyte in a sample. The method comprises: contacting the sample with a substrate that has a surface comprising an epoxy-based resin having a biomolecule probe directly bonded to the epoxy-based resin, wherein the biomolecule probe binds the analyte with specificity.

BRIEF DESCRIPTION OF THE DRAWINGS

FIG. 1A depicts signal strength vs. cell column position for a standard read buffer and FIG. 1B depicts signal strength vs. cell column position for a citrate read buffer, as described in Example 6.

DETAILED DESCRIPTION OF THE INVENTION

The invention is directed to a substrate for biological analysis and a method for making the substrate for biological analysis. The substrate for biological analysis comprises an epoxy-based resin having a biomolecule probe that is directly bonded to the epoxy-based resin.

The phrase "biomolecule probe directly bonded to the epoxy-based resin," and similar phrases, as used herein, means that the biomolecule probe is attached to the resin by simply contacting the biomolecule probe with the resin without first contacting the epoxy-based resin with another reagent that covalently reacts with the epoxy-based resin. The biomolecule probe can be passively attached to the epoxy-based resin or covalently attached to the epoxy-based resin.

The substrate for biological analysis is prepared by:
(i) providing a substrate that has a surface comprising an epoxy-based resin and
(iii) contacting a biomolecule probe with the epoxy-based resin so that the biomolecule probe bonds directly to the epoxy-based resin.

In one embodiment, the substrate is the epoxy-based resin.

In one embodiment, the substrate is a solid support coated with the epoxy-based resin. Illustrative solid support materials upon which the epoxy-based resin can be coated include, but are not limited to, particles, beads and surfaces comprising glass, polymers, latex, elemental metals, metal composites, alloys, silicon, carbon, and hybrids thereof.

In one embodiment, a portion of the epoxy-based resin is polymerized prior to contacting the biomolecule probe with the epoxy-based resin.

Suitable epoxy-based resins include, but are not limited to, EPON SU-8, EPON 1001F, 1002F, 1004F, 1007F, 1009F, 2002, and 2005 (commercially available from Hexion Specialty Chemicals of Fayetteville, NC). EPON SU-8 and EPON 1002F are preferred resins.

SU-8 is a photo-curable epoxy-based resin. SU-8 is a formaldehyde, polymer with (chloromethyl)oxirane and 4,4-(1-methylethylidene)bisphenol (CAS: 28906-96-9). SU-8 is a polymeric solid epoxy novolac resin possessing an average epoxide group functionality of around eight. The structure of SU-8 epoxy resin is:

SU-8 is commercially available from Hexion Specialty Chemicals as a solution containing SU-8 and a photo acid generator under the tradename EPON SU-8.

1002F is a photo-curable epoxy resin (CAS: 25036-25-3). 1002F is phenol, 4,4'-(1-methylethylidene)bis-, polymer with 2,2'-[(1-methylethylidene)bis(4,1-phenyleneoxymethylene)]bis(oxirane) and is commercially available from Hexion Specialty Chemicals as a solution containing 1002F and a photo acid generator under the tradename EPON 1002F:

Suitable, biomolecule probes include, but are not limited to, lipids, polysaccharides, amino acids, polypeptides, oligopeptides, peptides, antibodies and fragments thereof, polynucleotides (including single and double stranded DNA and RNA), oligonucleotides, aptamers, lectins, avidin, streptavidin, biotin, and polyethylene glycol. Preferably, the biomolecule probe is a polypeptide, oligopeptide, peptide, polynucleotide or shorter oligonucleotide. In one embodiment, the biomolecule is an antibody. In one embodiment, the biomolecule probe is a synthetic molecule, such as, for example, rhodamine. Illustrative biomolecule probes include SDMA, ADMA, T4, cortisol, progesterone, and enzymes (e.g., lipases, such as pancreatic lipase).

Without wishing to be bound by theory, it is believed that the biomolecule probe is bonded to the epoxy-based resin by the reaction of an amine, thiol, or hydroxyl groups on the biomolecule with epoxy groups on the resin. The biomolecule probe can also be passively bonded to the epoxy-based resin. The phrase "passively bonded," as used herein, means bonding by non-covalent interactions, such as Vander Walls, hydrophobic, hydrophilic, or hydrogen bonding interactions.

The substrate that has a surface comprising an epoxy-based resin can be, but is not limited to, a film, alone or adhered to another solid surface; a microbead; a microparticle; a micro pellet; a microwafer; a paramagnetic bead; a microparticle containing an identifying feature, such as a bar code; a paramagnetic microparticle; a paramagnetic microparticle containing a bar code; and a bead containing a nickel bar code.

In some embodiments, the biomolecule probe is bonded directly to the epoxy resin by simply contacting the epoxy-based resin with the biomolecule.

In one embodiment, the biomolecule probe is contacted with the epoxy-based resin by adding the substrate that has a surface comprising an epoxy-based resin to a solution of the biomolecule probe to provide a contact mixture. In one embodiment, the solution of the biomolecule probe is an aqueous solution. In one embodiment, the solution of the biomolecule probe is a buffered aqueous solution. In one embodiment, the solution of the biomolecule probe is a dimethyl sulfoxide (DMSO) solution.

In a preferred embodiment, the substrate that has a surface comprising an epoxy-based resin is washed with DMSO before the substrate that has a surface comprising an epoxy-based resin is added to the solution of the biomolecule probe to provide the contact mixture. In one embodiment, the substrate that has a surface comprising an epoxy-based resin is washed with DMSO immediately before it is contacted with the solution of the biomolecule probe to provide the contact mixture. It has been unexpectedly discovered that contacting the epoxy-based resin with DMSO before the epoxy resin is contacted with the biomolecule probe provides a substrate for biological analysis that exhibits less variability in how many biomolecule probes are bound to the epoxy resin and less variability in the signal obtained when detecting the presence of the analyte in the sample that binds to the biomolecule probe. It has been unexpectedly found that contacting the epoxy-based resin with DMSO before the epoxy resin is contacted with the biomolecule probe provides a substrate for biological analysis that exhibits a better signal.

By directly bonding the biomolecule probe to the epoxy-based resin, the method advantageously avoids the additional steps of having to functionalize the epoxy-based resin by (i) reacting the epoxy resin with another molecule before the biomolecule probe is bonded to the epoxy-based resin or (ii) mixing another molecule into the epoxy resin prior to polymerization. By avoiding this additional step, the method advantageously is faster, less expensive, and removes a step where errors or variability could potentially occur.

When a solution of the biomolecule probe is used to contact the biomolecule probe with the substrate that has a surface comprising an epoxy-based resin, the concentration of the biomolecule probe in the solution ranges from about 0.05 mg/mL to about 5 mg/mL, preferably about 0.01 mg/mL to about 3.0 mg/mL, and more preferably about 0.15 to about 2.5 mg/mL, for example about 1.5 mg/mL.

The concentration of the substrate that has a surface comprising an epoxy-based resin in the contact mixture ranges from about 0.05 to about 5.0 million substrates/mL, preferably about 0.1 to about 3.0 million substrates/mL. In one embodiment, the biomolecule probe is a peptide and the concentration of the substrate that has a surface comprising an epoxy-based resin in the contact mixture ranges from about 0.1 to about 3.0 million substrates/mL, for example about 2 million substrates/mL. In one embodiment, the biomolecule probe is an antibody and the concentration of the substrate that has a surface comprising an epoxy-based resin in the contacting mixture ranges from about 0.1 to about 1.8 million substrates/mL, for example about 1 million substrates/mL.

The solution of the biomolecule probe is typically contacted with the substrate that has a surface comprising an epoxy-based resin for a sufficient amount of time so that the biomolecule probe bonds to the epoxy-based resin. Typically the solution of the biomolecule probe is contacted with the substrate that has a surface comprising an epoxy-based resin for at least about 4 hours, preferably at least about 8 hours, more preferably at least about 10 hours. In one embodiment, the molecule probe is contacted with the substrate that has a surface comprising an epoxy-based resin for between about 4 hours and about 18 hours.

The contact mixture (i.e., the substrate that has a surface comprising an epoxy-based resin and the solution of the biomolecule probe) is maintained at a sufficient temperature so that the biomolecule probe bonds to the epoxy-based resin. In one embodiment, the contact mixture is maintained at a temperature of between about 4° C. to about 65° C., preferably between about 15° C. and about 30° C., and more preferably between about 18° C. and 27° C. In one embodiment, the contact mixture is stirred to assure that the surfaces of the substrate that has a surface comprising an epoxy-based resin are sufficiently contacted with the solution of the biomolecule probe.

In one embodiment, after the substrate that has a surface comprising an epoxy-based resin and the solution of the biomolecule probe are contacted so that the biomolecule probe is bonded to the epoxy-based resin, the solution of the biological probe is removed and the resulting biomolecule functionalized substrate is washed with a mixture of about 1% bovine serum albumin (BSA) (commercially available from Proliant Biologicals of Ankany IA), about 0.05% Tween-20 (commercially available from Sigma Aldrich of St. Louis, MO), and about 0.05% Proclin 950 (commercially available from Sigma Aldrich of St. Louis, MO) in phosphate buffered saline (PBS), at a pH of about 7.4. A suitable PBS solution includes about 1.8 mM sodium phosphate monobasic (commercially available from Sigma Aldrich of St. Louis, MO), about 8.4 mM sodium phosphate dibasic (commercially available from Sigma Aldrich of St. Louis, MO), and about 145 mM sodium chloride (commercially available from Amresco of Salon, OH). In one embodiment, the biomolecule functionalized substrate is washed is washed at least three times with at least about 200 μL of the wash solution. In one embodiment, the biomolecule functionalized substrate is washed at least three times with about 200 μL to about 1,000 μL of the wash solution.

Suitable buffers include, but are not limited to, phosphate, TRIS, HEPES, MES, EPPS, Bis-TRIS, Bis-TRIS propane, PIPES, ADA, MOPS, MOPSO, ACES, BES, Tricine, TES, Gly-Gly, DIPSO, inorganic buffers, organic buffers, acetic acid based, and citric acid based buffers.

The resulting washed biomolecule functionalized substrate can then be added to a solution of about 1% BSA, about 0.05% Tween-20, about 0.05% Proclin 950 in PBS at pH about 7.4, for use in an assay.

In a first aspect of the method, the biomolecule probe is a protein, such as an antibody, an enzyme (e.g., streptavidin and avidin), or parts of an antibody (e.g., Fc and FAB fragments), and the solution of the biomolecule probe is an aqueous solution. In one embodiment of the first aspect of the method, the solution of the biomolecule probe is an aqueous solution buffered with about 100 mM 2-(N-morpholino)ethanesulfonic acid (MES) and about 140 mM Guanidine-HCl at a pH of about 5.5. In one embodiment of the first aspect of the method, the solution of the biomolecule probe is an aqueous solution buffered with about 100 mM 3-[4-(2-hydroxyethyl)piperazin-1-yl]propane-1-sulfonic acid (EPPS) and 140 mM Guanidine-HCl at a pH of about 8 aqueous.

In one embodiment of the first aspect of the method, the substrate that has a surface comprising an epoxy-based resin is washed with a solution of PBS containing about 0.05% Tween-20 before it is contacted with the solution of the biomolecule probe. In one embodiment of the first aspect of the method, the substrate that has a surface comprising an epoxy-based resin is washed at least three times with at least about 200 μL of a solution of PBS containing about 0.05% Tween-20 before it is contacted with the solution of the biomolecule probe. In an embodiment of the first aspect of the method, the substrate that has a surface comprising an epoxy-based resin is washed at least three times with about 200 μL to about 1,000 μL of a solution of PBS containing about 0.05% Tween-20 before it is contacted with the solution of the biomolecule probe.

In a preferred embodiment of the first aspect of the method, the substrate that has a surface comprising an epoxy-based resin is then further washed with DMSO before it is contacted with the solution of the biomolecule probe. In one embodiment of the first aspect of the method, the substrate that has a surface comprising an epoxy-based resin is washed at least three times with at least about 200 μL of the wash solution. In one embodiment of the first aspect of the method, the substrate that has a surface comprising an epoxy-based resin is washed at least three times with about 200 μL to about 1,000 μL of DMSO before it is contacted with the solution of the biomolecule probe.

In one embodiment of the first aspect of the method, after the substrate that has a surface comprising an epoxy-based resin and the solution of the biomolecule probe are contacted so that the biomolecule probe is attached to the epoxy-based resin, the solution of the biological probe is removed and the resulting biomolecule functionalized substrate is washed with a mixture of about 1% BSA, about 0.05% Tween-20, and about 0.05% Proclin 950 in PBS at a pH of about 7.4. In one embodiment, the biomolecule functionalized substrate is washed at least three times with at least about 200 μL of the wash solution. In one embodiment, the biomolecule functionalized substrate is washed at least three times with about 200 μL to about 1,000 μL of the wash solution.

The resulting washed biomolecule functionalized substrate can then be added to a solution of about 1% BSA, about 0.05% Tween-20, about 0.05% Proclin 950 in PBS at pH about 7.4, for use in an assay.

In one embodiment of the first aspect of the method, the substrate that has a surface comprising an epoxy-based resin is a barcoded magnetic bead, such as a barcoded magnetic bead coated with SU-8 epoxy-based negative photoresist (commercially available from Applied BioCode of Santa Fe Springs, CA).

In a second aspect of the method, the biomolecule probe is a peptide that has a cysteine residue and the solution of the biomolecule probe is a solution in DMSO. In one embodiment of the second aspect of the method, the solution is DMSO containing about 1% Tween-20. In one embodiment of the second aspect of the method, the peptide concentration ranges from about 0.2 mM to about 1 mM peptide, for example, about 0.5 mM.

In one embodiment of the second aspect of the method, the substrate that has a surface comprising an epoxy-based resin is washed with a solution of DMSO containing about 1% Tween-20 before it is contacted with the solution of the biomolecule probe. In one embodiment of the second aspect of the method, the substrate that has a surface comprising an epoxy-based resin is washed at least three times with at least about 200 μL of a solution of DMSO containing about 1% Tween-20 before it is contacted with the solution of the biomolecule probe. In an embodiment of the second aspect of the method, the substrate that has a surface comprising an epoxy-based resin is washed at least three times with about 200 μL to about 1,000 μL of a solution of DMSO containing about 1% Tween-20 before it is contacted with the solution of the biomolecule probe.

In one embodiment of the second aspect of the method, after the substrate that has a surface comprising an epoxy-based resin and the solution of the biomolecule probe are contacted so that the biomolecule probe is bonded to the epoxy-based resin, the solution of the biological probe is removed and the resulting biomolecule functionalized substrate is washed with a mixture of about 1% BSA, about 0.05% Tween-20, and about 0.05% Proclin 950 in PBS at a pH of about 7.4. In one embodiment, the biomolecule functionalized substrate is washed at least three times with at least about 200 μL of the wash solution. In one embodiment, the biomolecule functionalized substrate is washed at least three times with about 200 μL to about 1,000 μL of the wash solution.

The resulting washed biomolecule functionalized substrate can then be added to a solution of about 1% BSA, about 0.05% Tween-20, about 0.05% Proclin 950 in PBS at a pH of about 7.4, for use in an assay.

In one embodiment of the second aspect of the method, the substrate that has a surface comprising an epoxy-based resin is a barcoded magnetic bead, such as a barcoded magnetic bead coated with SU-8 epoxy-based negative photoresist (commercially available from Applied BioCode of Santa Fe Springs, CA).

Without wishing to be bound by theory, the second aspect of the method involves reaction of a thiol group on the biomolecule probe with epoxide groups on the epoxy-based resin. This cysteine residue can occur anywhere in the peptide sequence. A cysteine can also be spaced from the peptide with a linker, such as a PEG linker. The PEG can be of a defined length, such as through the use of a discreet PEG. dPEG (commercially available from Quanta Biodesign, Plain City, OH) is a particularly suitable PEG. Methods for linking a cysteine residue to a protein with a PEG linker are known in the art. See, for example, I. Hamley, PEG-Peptide Conjugates, Biomacromolecules, 15:1543-59, 2014. Other linkers and spacers include beta-alanine, 4-aminobutyric acid (GABA), (2-aminoethoxy) acetic acid (AEA), 5-aminovaleric acid (Ava), 6-aminohexanoic acid (Ahx), Trioxatridecan-succinamic acid (Ttds) and peptides.

In one embodiment, the peptides is capped at the N and C termini via N-terminal acetylation (Ac) or C-terminal amidation. When the biomolecule probe is an antibody, the antibody can be bonded to the epoxy-based resin via a thiol group by reducing the antibody using a reducing reagent, such as dithiothreitol (DTT), tris(2-carboxyethyl)phosphine (TCEP), or β-mercaptoethanol (BME), to make thiol groups in the hinge region of the antibody accessible for bonding to the epoxy-based resin.

In one embodiment, the substrate that has a surface comprising an epoxy-based resin is prepared by coating a support with a solution containing SU-8 resin and a photo acid generator, such as triphenyl sulfonium hexafluoroantimonate, in a solvent, such as γ-butyrolactone or cyclopentanone, such as EPON SU-8 (commercially available from Hexion Specialty Chemicals of Fayetteville, NC). The support is then heated to remove the solvent and leave a coating of solid epoxy-based resin on the support. The thickness of the solid epoxy-based resin can be several hundred microns thick. Typically, the thickness of the solid epoxy-based resin ranges from about 1 nm to about 3 mm. Optionally, a portion of the solid epoxy-based resin is then polymerized by irradiation with UV light to provide a polymerized epoxy-based resin. In one embodiment, a photomask is placed on top of the solid epoxy-based resin before it is irradiated with UV light so that a pattern is left on the polymerized epoxy-based resin. In one embodiment, the support is separated from the solid epoxy-based resin In one embodiment, the substrate that has a surface comprising an epoxy-based resin is prepared by coating the support with a solution containing 1002F resin and a photo acid generator, such as triphenyl sulfonium hexafluoroantimonate, in a solvent, such as γ-butyrolactone or cyclopentanone, such as EPON 1002F (commercially available from Hexion Specialty Chemicals of Fayetteville, NC). The support is then heated to remove the solvent and leave a coating of a solid epoxy-based resin on the support. The thickness of the solid epoxy-based resin can be several hundred microns thick. Typically, the thickness of the solid epoxy-based resin ranges from about 1 nm to about 3 mm. Optionally, a portion of the solid epoxy-based resin is then polymerized by irradiation with UV light to provide a polymerized epoxy-based resin. In one embodiment, a photomask is placed on top of the solid epoxy-based resin before it is irradiated with UV light so that a pattern is left on the polymerized epoxy-based resin. In one embodiment, the support is separated from the solid epoxy-based resin.

In one embodiment, the sample is a fecal sample. The term "fecal sample", as used herein, includes feces, any sample containing feces, and fractions and extracts of feces. Methods for the preparation of fecal extracts are described in U.S. Pat. No. 8,367,808. In one embodiment, the molecule being assayed for (i.e., the analyte) is a protein generated by, for example, an intestinal worm, such as, for example, a round worm, a whip worm, a hookworm, a tape worm, or a heart worm, or the parasite *Giardia*, and the biomolecule probe is an antibody to the protein. In one embodiment, the antibody is specific for coproantigens. In one embodiment, the biomolecule probe is selected from the group consisting of an antibody that specifically binds a coproantigen from roundworm, an antibody that specifically binds a coproantigen from whipworm, an antibody that specifically binds a coproantigen from hookworm, an antibody that specifically binds a coproantigen from tapeworm, an antibody that specifically binds an antigen from heartworm, and an antibody that specifically binds a coproantigen from *Giardia*.

Examples of antibodies that specifically bind coproantigens from hookworm are disclosed in U.S. Pat. Nos. 9,239,326 and 8,895,294. Examples of antibodies that specifically bind coproantigens from roundworm are disclosed in U.S. Pat. Nos. 8,097,261; 9,212,220; 9,103,823; 8,105,795; and 8,895,294. Examples of antibodies that specifically bind coproantigens from whipworm are disclosed in U.S. Pat. Nos. 8,367,808 and 8,895,294. Examples of antibodies that specifically bind coproantigens from tapeworm are disclosed in U.S. Pat. No. 11,001,626. Examples of antibodies that specifically bind coproantigens from *Giardia* are disclosed in H. Stibbs, *Monoclonal antibody-based enzyme immunoassay for Giardia lamblia antigen in human stool*, J. Clin. Microbiol., (11):2582-2588, November 1989 and H. Stibbs et al., *Identification of Giardia lamblia-specific antigens in infected human and gerbil feces by western immunoblotting*, J. Clin. Microbiol., (10):2340-6, October 1990.

In one embodiment, the sample is a blood sample from a subject, the analyte is an antibody generated by the subject's immune response to a protein generated by an infectious agent and the biomolecule probe is a protein, polypeptide, or oligopeptide that is capable of specifically binding the antibody. Proteins, polypeptides, or oligopeptides that are capable of specifically binding circulating antibodies of an animal that has been infected with bacteria of the genus *Ehrlichia*, including *Ehrlichia canis, Ehrlichia chaffeensis* and/or *Ehrlichia ewingii*, are disclosed in U.S. Pat. Nos. 7,087,372; 7,407,770; 7,445,788; 7449,191; 7,842,473; 7,888,054; 8,980,274; 7,183,060; 7,744,872; 8,409,817; 9,850,295; 8,158,751, and 9,605,032. Proteins, polypeptides, or oligopeptides that are capable of specifically binding circulating antibodies of an animal that has been infected with bacteria of the genus *Anaplasma*, including *Anaplasma phagocytophylum* and *Anaplasma platys*, are disclosed in U.S. Pat. Nos. 6,964,855; 7,439,321; 8,303,959; 6,306,402; 6,204,252; 8,093,008, and 9,120,857. Proteins, polypeptides, or oligopetides that are capable of specifically binding circulating antibodies of an animal that has been infected with bacteria of the genus *Borrelia*, including *Borrelia burgdorferi*, are disclosed in U.S. Pat. Nos. 6,719,983; 6,740,744; 6,475,492, and 6,660,274.

In one embodiment, the analyte is an antibody resulting from the subjects response to a protein generated by a *Borrelia burgdorferi*, that causes Lyme disease, and the biomolecule probe is the protein, or part of the protein, generated by *Borrelia burgdorferi*.

In one embodiment, the sample is a blood sample from a subject, the analyte is a metabolite, and the biomolecule probe is an antibody that is capable of specifically binding the metabolite. The term "blood sample", as used herein, includes whole blood or any portion or fraction of whole blood, including but not limited to serum and plasma.

In one embodiment, the analyte is symmetric dimethylarginine (SDMA). Antibodies that specifically bind SDMA are disclosed in U.S. Pat. No. 8,481,690.

In one embodiment, the sample is a blood sample from a subject and the analyte is an antigen originating from a pathogen that is present in the blood of an infected subject and the biomolecule probe is an antibody against the antigen. In one embodiment, the analyte is an antibody that specifically bind circulating antigens from heartworm (*Diro-*

*filaria immitis*). Antibodies that specifically bind circulating antigens from heartworm (*Dirofilaria immitis*) are disclosed in U.S. Pat. No. 4,839,275.

In one embodiment, the substrate for biological assaying is prepared by a method that involves:

(i) providing a silicon/aluminum wafer;
(ii) coating the silicon/aluminum wafer with a first solution of a first epoxy-based resin dissolved in a first solvent to provide a silicon/aluminum wafer coated with a first epoxy-based resin coating;
(iii) heating the silicon/aluminum wafer coated with a first epoxy-based resin coating to remove at least a portion of the first solvent to provide a silicon/aluminum wafer coated with a first solid epoxy-based resin coating;
(iv) depositing a nickel bar code on the first solid epoxy-based resin coating to provide a silicon/aluminum wafer with a first solid epoxy resin coating and a nickel bar code;
(v) coating the nickel bar code with a second solution of a second epoxy-based resin dissolved in a second solvent to provide a silicon/aluminum wafer coated with a first epoxy-based resin coating and a second epoxy-based resin coating;
(vi) heating the silicon/aluminum wafer with a first solid epoxy-based resin coating and a second epoxy-based resin coating to remove at least a portion of the second solvent to provide a silicon/aluminum wafer coated with a first solid epoxy-based resin coating and a second solid epoxy-based resin coating,
wherein the nickel bar code is between the first solid epoxy-based resin coating and the second solid epoxy-based resin coating;
(vii) optionally, polymerizing at least a portion of the first solid epoxy-based resin coating and the second solid epoxy-based resin coating to provide a silicon/aluminum wafer layered with the first solid epoxy-based resin, the nickel bar code, and the second solid epoxy-based resin coating, wherein at least a portion of the first solid epoxy-based resin coating and the second solid epoxy-based resin coating has been polymerized;
(viii) separating the silicon/aluminum wafer from the silicon/aluminum wafer coated with the first epoxy-based resin coating, the nickel bar code, and the second epoxy-based resin coating to provide a bar coded magnetic bead;
(iv) contacting the bar coded magnetic bead with a biomolecule so that the biomolecule bonds directly to the epoxy-based resin.

In one embodiment, the first solution of a first epoxy-based resin dissolved in a first solvent is the same and the second solution of a second epoxy-based resin dissolved in a second solvent.

In one embodiment, the silicon/aluminum wafer is separated from the first solid epoxy resin, the nickel bar code, and the second solid epoxy resin coating by contacting the silicon/aluminum wafer with sodium hydroxide.

The invention is also directed to a method of assaying for the presence of an analyte in a sample. The method comprises: contacting the sample with a substrate that has a surface comprising an epoxy-based resin having a biomolecule probe directly bonded to the epoxy-based resin, wherein the biomolecule probe binds the analyte with specificity.

The phrases "binds the analyte with specificity," "specifically binds," "with specificity," "specific for the analyte," and similar phrases, as used herein, have their art-recognized meaning, i.e., that the biomolecule probe recognizes and binds to the analyte (or a class of analytes) with greater affinity than it binds to other non-specific molecules. For example, an antibody raised against an antigen that binds the antigen more efficiently than other non-specific molecules can be described as specifically binding to the antigen. Binding specificity can be tested using methodology known in the art such as, for example, an enzyme-linked immunosorbant assay (ELISA), a radioimmunoassay (RIA), surface plasmon resonance, or a western blot assay.

In one embodiment, the sample is a fecal sample. In one embodiment, the analyte is a protein generated by an intestinal worm and the biomolecule probe is an antibody against the protein generated by the intestinal worm. In one embodiment, the antibody against the protein generated by the intestinal worm is selected from the group consisting of an antibody that specifically binds a coproantigen from roundworm, an antibody that specifically binds a coproantigen from whipworm, an antibody that specifically binds a coproantigen from hookworm, an antibody that specifically binds a coproantigen from tapeworm, an antibody that specifically binds an antigen from heartworm, and an antibody that specifically binds a coproantigen from *Giardia*.

In one embodiment, the sample is a blood sample from a subject, the analyte is an antibody generated by the subject's immune response to a protein generated by an infectious agent, and the biomolecule probe is a protein, polypeptide, or oligopeptide that is capable of specifically binding the antibody.

In one embodiment, the analyte is an antibody resulting from the subjects response to a protein generated by a *Borrelia burgdorferi*, that causes Lyme disease, and the biomolecule probe is the protein, or part of the protein, generated by *Borrelia burgdorferi*.

In one embodiment, the sample is a blood sample from a subject, the analyte is a metabolite, and the biomolecule probe is an antibody that is capable of specifically binding the metabolite. In one embodiment, the analyte is symmetric dimethylarginine (SDMA).

In one embodiment, the sample is a blood sample from a subject and the analyte is an antigen originating from a pathogen that is present in the blood of an infected subject and the biomolecule probe is an antibody against the antigen. In one embodiment, the analyte is an antibody that specifically bind circulating antigens from heartworm (*Dirofilaria immitis*).

EXAMPLES

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims. Such variations of the invention, including the substitution of all equivalents now known or later developed, which would be within the purview of those skilled in the art, and changes in formulation or minor changes in experimental design, are to be considered to fall within the scope of the invention incorporated herein.

Example 1: Passive Coupling of a Biomolecule Probe to Barcoded Magnetic Beads

Barcoded magnetic beads (BMBs) are manufactured from SU-8, an epoxy-based negative photoresist (commercially available from Applied BioCode Corp. of Santa Fe Springs, CA). Coupling a biomolecule probe, such as a monoclonal antibody or protein, to BMBs was achieved via absorption of the biomolecule probe onto the BMB surface according to the following procedure.

A solution of the monoclonal antibody at a final concentration of about 0.15-2.5 mg/mL antibody (typically about 1.5 mg/mL) was prepared in an aqueous buffer containing about 100 mM MES (commercially available from Sigma Aldrich of St. Louis, MO) and about 140 mM Guanidine-HCl (commercially available from Sigma Aldrich of St. Louis, MO) at a pH of about 5.5 or an aqueous buffer containing about 100 mM EPPS (commercially available from Sigma Aldrich of St. Louis, MO) and about 140 mM Guanidine-HCl at a pH of about 8 to provide an antibody coating solution.

A sufficient amount of the BMBs was suspended in a BMB wash buffer (about 1.8 mM sodium phosphate monobasic (commercially available from Sigma Aldrich of St. Louis, MO), about 8.4 mM sodium phosphate dibasic (commercially available from Sigma Aldrich of St. Louis, MO), about 145 mM sodium chloride (commercially available from Amresco LLC of Salon, OH), and about 0.05% Tween-20 (commercially available from Sigma Aldrich of St. Louis, MO) at a pH of about 7.4) to provide a final concentration of about 0.1-1.8 million BMBs/mL (typically about 1 million/mL for antibodies). The BMBs were washed three times with the BMB wash buffer. All BMB washes (for this and subsequent steps) proceed as follows:

First place the tube containing the BMBs in a magnetic stand and allow the BMBs to adhere to the magnet for 1-10 minutes. Then carefully aspirate off the supernatant before resuspending the BMBs in a volume of wash buffer about equal to the original suspension volume of the BMBs (about 200 µL to about 1,000 µL). Repeat these steps a total of three times to provide a BMB pellet.

Following washing the BMBs with wash buffer, the BMBs were washed three times with a volume of DMSO (commercially available from Sigma Aldrich of St. Louis, MO) about equal to the original suspension volume to provide a pellet of DMSO washed BMBs.

Coating Reaction: Following the DMSO wash, the antibody coating solution (about 1.5 mg/mL final concentration) was immediately combined with the DMSO washed BMBs (about 1 million BMBs/mL final concentration) and incubated for 4-18 hours at room temperature (18-27° C.) with mixing. After the incubation was complete, the antibody coupled BMBs were washed three times with Assay Buffer (about 1% BSA (commercially available from Proliant biologicals of Ankany Iowa), about 0.05% Tween-20 (commercially available from Sigma Aldrich of St. Louis, MO), and about 0.05% Proclin 950 (commercially available from Sigma Aldrich of St. Louis, MO) in about 1.8 mM sodium phosphate monobasic (commercially available from Sigma Aldrich of St. Louis, MO), about 8.4 mM sodium phosphate dibasic (commercially available from Sigma Aldrich of St. Louis, MO), and about 145 mM sodium chloride (commercially available from Amresco LLC of Salon, OH), at a pH of about 7.4).

The antibody coupled BMBs are then suspended in the Assay Buffer at the desired final concentration for use in an assay.

Example 2: Coupling a Biomolecule Probe to Barcoded Magnetic Beads Via a Thiol Group Coupling a biomolecule probe, such as a monoclonal antibody or protein, containing a thiol group to barcoded magnetic beads (BMBs) that are coated with an epoxy-based resin is achieved via absorption of the biomolecule probe onto the BMB surface according to the following procedure.

A solution of the peptide in DMSO (commercially available from Sigma Aldrich of St. Louis, MO) containing about 1% Tween-20 (commercially available from Sigma Aldrich of St. Louis, MO) at a final peptide concentration of about 0.02 to about 1 mM (typically about 0.1 mM) was prepared to provide a peptide coating solution. The peptide used for this example was acetylated-Cys(dPEG12)[peptide]-amide, wherein the peptide was an oligopeptide of 25 amino acid residues and dPEG12 is a discreet PEG12. The acetylated-Cys(dPEG12)[peptide]-amide was provided as a custom synthesis from New England Peptide of Gardner, MA:

Suitable BMBs for use in the method are BMBs that are manufactured from SU-8, an epoxy-based negative photoresist (commercially available from Applied BioCode Corp. of Santa Fe Springs, CA).

A sufficient amount of BMBs to provide a final concentration of about 0.1-3 million BMBs/mL (typically about 2 million/mL) in the coating reaction described below were suspended in a BMB wash buffer (about 1% Tween-20 in DMSO) at a volume of about 200 to about 1,000 µL. The BMBs were washed three times with the about 1% Tween-20 in DMSO as described below. All BMB washes (for this and subsequent steps) proceed as follows:

The tube containing the BMBs was placed in a magnetic stand and the BMBs were allowed to adhere to the magnet for 1-10 minutes. The supernatant was carefully aspirated off before resuspending the BMBs in a volume of wash buffer about equal to the original suspension volume of the BMBs. These steps were repeated a total of three times to provide a BMB pellet.

Immediately after washing the BMBs with wash buffer, the washed BMBs were combined with the peptide coating solution and incubated for about 4 hours at room temperature (18-27° C.) with mixing. Following the 4 hour incubation, the peptide-coupled BMBs were washed three times with a volume of Assay Buffer (about 1% BSA, about 0.05% Tween-20, and about 0.05% Proclin 950 in about 1.8 mM sodium phosphate monobasic, about 8.4 mM sodium phosphate dibasic, and about 145 mM sodium chloride, at a pH of about 7.4).

The peptide coupled BMBs are then suspended in the Assay Buffer at the desired final concentration for use in an assay.

Example 3: Coupling a Biomolecule Probe to Barcoded Magnetic Beads Via a Thiol Group Generated from a Reduced Disulfide-Linked Cysteine Macromolecules, such as monoclonal antibodies, can be coupled via a thiol group by reacting the monoclonal antibody with a reducing reagent, such as dithiothreitol (DTT), tris(2-carboxyethyl)phosphine (TCEP), or 2-mercaptoethanol (BME) to reduce disulfide-linked cysteine side chains so as to make them accessible for bonding to the surface of the BMBs.

For covalent coupling of reduced antibodies to epoxy groups on BMBs, a reduced antibody coating solution was prepared by diluting the antibody in a reducing buffer (50 mM sodium phosphate (commercially available from Sigma Aldrich of St. Louis, MO), 75 mM sodium chloride (commercially available from Amresco LLC of Salon, OH), 2 mM EDTA (commercially available from Sigma Aldrich of St. Louis, MO), and 5 mM DTT (commercially available from Thermo Fisher Scientific of Waltham, MA) at a pH of about 7.4) to a concentration of about 5 mg/mL. The resulting solution was incubated for about 0.5 hours at 18-27° C.

Following the reduction, the reduced antibody was exchanged into a solution containing 50 mM sodium phosphate (commercially available from Sigma Aldrich of St. Louis, MO), 75 mM sodium chloride (commercially available from Amresco of Salon, OH), and 2 mM EDTA (commercially available from Sigma Aldrich of St. Louis, MO) at a pH of about 7.4 using a G25 Zeba Spin desalting column (commercially available from Thermo Fisher Scientific of Waltham, MA) according to the manufacturer's instructions. The antibody solution was adjusted to a concentration of about 0.5 mg/mL and the resulting solution immediately added to DMSO washed BMBs.

DMSO washed BMBs were prepared by first suspending a sufficient amount of the BMBs to provide a final concentration of about 0.1-1.8 million BMBs/mL (typically about 1 million/mL for antibodies) in the coating reaction described below in a volume of about 200 μL to about 1,000 μL of a wash buffer (about 1.8 mM sodium phosphate monobasic, about 8.4 mM sodium phosphate dibasic, about 145 nM sodium, and about 0.05% Tween-20, at a pH of about 7.4). The BMBs were washed three times with the wash buffer as described below.

All BMB washes (for this and subsequent steps) proceed as follows: first place the tube containing the BMBs in a magnetic stand and allow the BMBs to adhere to the magnet for 1-10 minutes. Then carefully aspirate off the supernatant and resuspend the BMBs in a volume of wash buffer about equal to the original volume used to suspend the BMBs. Repeat these steps three times to provide a BMB pellet.

Following washing of the BMBs with wash buffer, the BMBs were washed three times with a volume of DMSO (commercially available from Sigma Aldrich of St. Louis, MO) about equal to the original suspension volume to provide DMSO washed BMBs. The BMBs were then suspended in a volume of DMSO about equal to the original suspension volume and incubated for about 4 hours at 18-27° C. with mixing. Following the incubation, the tube containing the BMBs were placed in a magnetic stand and the BMBs allowed to adhere to the magnet for 1-10 minutes. The supernatant was then carefully aspirated off to provide DMSO washed BMB pellets.

Suitable BMBs for use in the method are BMBs that are manufactured from SU-8, an epoxy-based negative photoresist (commercially available from Applied BioCode Corp. of Santa Fe Springs, CA).

Following the DMSO wash, the antibody coating solution (about 0.5 mg/mL final concentration) was immediately combined with the DMSO washed BMBs (about 1 million BMBs/mL final concentration) and incubated for about 18 hours at room temperature (18-27° C.) with mixing.

After the incubation was completed, the tube containing the BMBs was placed in a magnetic stand and the BMBs allowed to adhere to the magnet for 1-10 minutes. The supernatant was then carefully aspirated off and the BMBs resuspended in a volume of wash buffer (about 1.8 mM sodium phosphate monobasic, about 8.4 mM sodium phosphate dibasic, about 145 mM sodium chloride, and about 0.05% Tween- at a pH of about 7.4) about equal to the original suspension volume and the resulting solution incubated for about 15 minutes at 18-27° C.

After the incubation was complete, the tube containing the BMBs was placed in a magnetic stand and the BMBs allowed to adhere to the magnet for 1-10 minutes. The supernatant was then carefully aspirated off and the BMBs resuspended in a volume of Assay Buffer about equal to the original suspension volume. Assay Buffer: about 1% BSA, about 0.05% Tween-20, and about 0.05% Proclin 950 in about 1.8 mM sodium phosphate monobasic, about 8.4 mM sodium phosphate dibasic, and about 145 nM sodium chloride, at a pH of about 7.4. The resulting suspension was incubated for about 30 minutes at 18-27° C. with mixing. The antibody coupled BMBs were then washed three times with a volume of Assay Buffer about equal to the original suspension volume.

The antibody coupled BMBs were then suspended in the Assay Buffer at the final desired concentration for use in an assay.

Example 4: Coupling Rhodamine to Barcoded Magnetic Beads

Materials

| Material | Number | Barcode | Concentration | Molecular weight (g/mol) | Supplier |
|---|---|---|---|---|---|
| Epoxy BMBs | 0.5 million | 36 | 500,000 beads/mL | | Applied BioCode |
| Epoxy BMBs | 0.5 million | 61 | 500,000 beads/mL | | Applied BioCode |
| Epoxy BMBs | 0.5 million | 14 | 500,000 beads/mL | | Applied BioCode |
| Magnet stand | 1 | | | | |
| DMSO | | | | | Sigma Aldrich |
| Rhodamine Lissamine | | | 0.3 mg/mL | 600.7 | ThermoFisher |
| Sulforhodamine | | | 2.8 mg/mL | 558.7 | ThermoFisher |
| PBS-Tween (0.05%) | | | 0.05% Tween | | IDEXX-In house |
| EPPS buffer, pH = 9.0 | | | 150 mM EPPS | | IDEXX- In house |

DMSO Washing of the BMBs

To 1 mL centrifuge tubes on a magnetic rack was added 0.5 mL of BMBs suspended in a storage buffer to provide a concentration of 100,000 BMBs/mL.

Suitable BMBs for use in the method are BMBs that are manufactured from SU-8, an epoxy-based negative photoresist (commercially available from Applied BioCode Corp. of Santa Fe Springs, CA). The BMBs are provided in a storage buffer containing sodium chloride (0.8%), potassium chloride (0.02%), disodium hydrogen phosphate (0.144%), potassium dihydrogen phosphate (0.024%), Tween-20 (0.05%), and ProClin-950 (0.1%).

The liquid was removed from each of the centrifuge tubes by pipette and then about 0.5 mL of DMSO (commercially available from Sigma Aldrich of St. Louis, MO) was added to each tube. The tubes were vortexed vigorously for 10 seconds, placed back onto the magnetic rack, allowed to sit for 1 minute, and the DMSO removed by pipette. This washing procedure was repeated 2 more times. About 0.5 mL of DMSO was then added to each tube, the tube vortexed vigorously, and placed on mixer for 4 hours at room temperature.

Coating with Rhodamine-Lissamine

After mixing for 4 hours, the tubes were removed and placed on a magnet stand, allowed to sit for 1 minute, the DMSO removed by pipette, and about 0.5 mL of about 150 mM EPPS buffer, at a pH of about 9.0, was added to the tubes. The tubes containing the BMBs in the EPPS buffer were then vortexed vigorously for 10 seconds, placed back on the magnet stand, and the EPPS buffer removed by pipette. This washing procedure was repeated 2 more times. After the washing was completed, about 0.5 mL of EPPS buffer was added to each tube and the tubes vortexed. Then about 10.0 μM rhodamine-lissamine (9 μL of a 0.3 mg/mL solution in DMSO) or sulfo-rhodamine (control, 1.2 μL of a 2.8 mg/mL solution in DMSO) was added to the epoxy-based BMBs in the EPPS buffer. The suspension of BMBs were allowed to rotate end over end for about 22 hours at room temperature, protected from light. After this time, the coated BMBs were placed on the magnetic stand and the solvent removed by pipette. The coated BMBs were washed with about 1.0 mL of a solution of about 1.8 mM sodium phosphate monobasic, about 8.4 mM sodium phosphate dibasic, about 145 nM sodium chloride, and about 0.05% Tween-20 with brief vortexing, followed by removal of the solvent. This process was repeated 5 times. Finally, about 1.0 mL of a solution of about 1.8 mM sodium phosphate monobasic, about 8.4 mM sodium phosphate dibasic, about 145 nM sodium chloride, and about 0.05% Tween-20 was added to the coated BMBs to provide a final concentration of about 50,000 BMBs/mL. About 5.0 μL of the BMBs in the resulting suspension were then added to the wells of a 96-well plate to give a final count of about 250 BMBs/well. About 200 μL of the solution of about 1.8 mM sodium phosphate monobasic, about 8.4 mM sodium phosphate dibasic, about 145 nM sodium chloride, and about 0.05% Tween-20 was added to each well to provide a suspension of the BMBs for use in an assay.

The fluorescence of each well was determined using a microplate reader (commercially reader Applied BioCode Corp. of Santa Fe Springs, CA).

Epoxy BMBs coated with Rhodamine-Lissamine showed significant fluorescence in the microplate reader, indicating that the rhodamine probe had been efficiently coated onto the epoxy-based BMB surface. The epoxy-based BMBs incubated with the sulfo-rhodamine control, which does not have a reactive amine functional group, did not show any observable fluorescence. This demonstrates that nonspecific binding of the rhodamine probes to the epoxy-based BMB surface is very low, and indicates that the Rhodamine-Lissamine is reacting with the epoxy-based surface specifically through the primary amine functionality. It can be concluded that amine-functionalized small molecules are capable of covalently binding to the epoxy-based BMB surface.

Example 5: Coupling of Amine-Containing Peptides to Barcoded Magnetic Beads

Materials

| Material | Number | Barcode | Concentration | Molecular weight (g/mol) | Supplier |
|---|---|---|---|---|---|
| Epoxy BMBs | 200,000 | 14 | 200,000 beads/mL | | Applied BioCode |
| Magnet stand | 1 | | | | |
| Biotin-Lyme Peptide | | | 1.0 mM | 3075 | ThermoFisher |
| Lyme-Alexafluor555 no Cysteine | | | 1.0 mM | 3948 | New England Peptide |
| DMSO | | | | | Sigma Aldrich |
| PBS-Tween (0.05%) | | | 0.05% Tween | | IDEXX-In house |
| EPPS buffer, pH = 9.0 | | | 150 mM EPPS | | IDEXX- In house |
| SA-PE | | | 8 ug/mL | | IDEXX- In house |

DMSO Washing of the BMBs

To 1 mL centrifuge tubes on a magnetic rack was added about 0.2 mL of BMBs suspended in a storage buffer to provide a concentration of 100,000 BMBs/mL.

Suitable BMBs for use in the method are BMBs that are manufactured from SU-8, an epoxy-based negative photo-resist (commercially available from Applied BioCode Corp. of Santa Fe Springs, CA). The BMBs are provided in a storage buffer containing sodium chloride (0.8%), potassium chloride (0.02%), disodium hydrogen phosphate (0.144%), potassium dihydrogen phosphate (0.024%), Tween-20 (0.05%), and ProClin-950 (0.1%).

The liquid was removed from each of the centrifuge tubes by pipette and then about 0.2 mL of DMSO (commercially available from Sigma Aldrich of St. Louis, MO) was added to each tube. The tubes were vortexed vigorously for 10 seconds, placed back onto the magnetic rack, allowed to sit for 1 minute, and the DMSO removed by pipette. This washing procedure was repeated 2 more times. About 0.2 mL of DMSO was then added to each tube, the tube vortexed vigorously, and placed on mixer for 4 hours at room temperature.

After mixing for 4 hours, the tubes were removed and placed on a magnet stand, allowed to sit for 1 minute, the DMSO removed by pipette, and about 0.2 mL of about 150 mM EPPS buffer, at a pH of about 9.0, was added to the tubes. The tubes containing the BMBs in the EPPS buffer were then vortexed vigorously for 10 seconds, placed back on the magnet stand, and the EPPS buffer removed by pipette. This washing procedure was repeated 2 more times.

About 0.1 mM solutions of both biotin-lyme peptide and Lyme-Alexafluor555 were prepared from 1.0 mM stock solutions. Each peptide has multiple lysine residues, but no cysteine residues or other thiol groups. About 200 μL of the biotin-lyme peptide solution, the Lyme-Alexafluor555 solution, or a control containing only EPPS buffer was added to the tubes containing the BMBs. The resulting suspension of BMBs was allowed to rotate end over end for about 2 hours at room temperature, protected from light. After this time, the tubes containing the BMBs were placed on the magnetic rack and the solvent removed by pipette. The BMBs were then washed with about 0.2 mL of a solution of about 1.8 mM sodium phosphate monobasic, about 8.4 mM sodium phosphate dibasic, about 145 nM sodium chloride, and about 0.05% Tween-20 with brief vortexing, followed by removal of the solvent. This process was repeated 2 times.

About 200 µL of SA-PE (streptavidin phycoerythrin)-containing solution (8 µg/mL SA-PE, obtained by diluting SA-PE (commercially available as a 1 mg/mL solution from Moss Inc. of Pasadena, MD) with Multiplex Assay Buffer: 1.8 mM sodium phosphate monobasic, 8.4 mM sodium phosphate dibasic, 145 nM sodium chloride, 0.05% Tween-20, 1% bovine serum albumin, 0.05% ProClin 950 was added to the BMBs and the beads incubated for about 10 minutes. Following incubation the supernatant was removed and the BMBs were washed with about 0.2 mL of a solution of about 1.8 mM sodium phosphate monobasic, about 8.4 mM sodium phosphate dibasic, about 145 nM sodium chloride, and about 0.05% Tween-20 at a pH of about 7.4 with brief vortexing, followed by removal of the solvent. This process was repeated 5 times. Finally, about 0.4 mL of a solution of about 1.8 mM sodium phosphate monobasic, about 8.4 mM sodium phosphate dibasic, about 145 nM sodium chloride, and about 0.05% Tween-20 at a pH of about 7.4 was added to the coated BMBs to provide a final concentration of about 50,000 BMBs/mL. 5.0 µL of the resulting suspension of BMBs was added to the wells of a 96-well plate to give a final count of about 250 BMBs/well and about 200 µL of the solution of about 1.8 mM sodium phosphate monobasic, about 8.4 mM sodium phosphate dibasic, about 145 nM sodium chloride, and about 0.05% Tween-20 was added to each well to provide a suspension of the BMBs for use in an assay.

The fluorescence of each well was determined using a microplate reader (commercially reader Applied BioCode Corp. of Santa Fe Springs, CA).

BMBs coated with Biotin-Lyme Peptide and the Lyme-Alexafluor555 peptide both showed significant fluorescence in the microplate reader indicating that the peptides had been efficiently coated onto the BMB surface. The lack of fluorescence observed in the control demonstrates that nonspecific binding of the SA-PE analyte to the BMB surface is very low, and indicates that the Biotin-Lyme Peptide and the Lyme-Alexafluor555 peptide is reacting with the epoxy surface specifically through the primary amine functionality contained in the lysine residues of the peptide. It can be concluded that lysine (amine functionality) containing peptides are capable of covalently binding to the epoxy BMB surface.

Example 6: Assay Using Barcoded Magnetic Beads Followed by a Citrate Buffer Wash Coupling of Biomolecule Probe to Barcoded Magnetic Beads To 1 mL centrifuge tubes on a magnetic rack was added about 0.2 mL (volume can vary from about 0.1 mL to about 500 mL) of BMBs suspended in a storage buffer to provide a concentration of about 100,000 BMBs/mL (concentration can range from about 100,000 BMBs/mL to about 3 million BMBs/mL).

Suitable BMBs for use in the method are BMBs that are manufactured from SU-8, an epoxy-based negative photoresist (commercially available from Applied BioCode Corp. of Santa Fe Springs, CA). The BMBs are provided in a storage buffer containing sodium chloride (0.8%), potassium chloride (0.02%), disodium hydrogen phosphate (0.144%), potassium dihydrogen phosphate (0.024%), Tween-20 (0.05%), and ProClin-950 (0.1%).

The liquid was removed from each of the centrifuge tubes by pipette and then about 0.2 mL of DMSO (commercially available from Sigma Aldrich of St. Louis, MO) was added to each tube. The tubes were vortexed vigorously for 10 seconds, placed back onto the magnetic rack, allowed to sit for 1 minute, and the DMSO removed by pipette. This washing procedure was repeated 2 more times. In one embodiment, about 0.2 mL of DMSO was then added to each tube, the tube vortexed vigorously, and placed on a mixer for 4 hours at room temperature. This 4 hour mix at room temperature is optional.

After mixing, the tubes were removed and placed on a magnet stand, allowed to sit for 1 minute, the DMSO removed by pipette, and about 0.2 mL of about 150 mM EPPS buffer, at a pH of about 9.0, was added to the tubes. The tubes containing the BMBs in the EPPS buffer were then vortexed vigorously for 10 seconds, placed back on the magnet stand, and the EPPS buffer was removed by pipette. This washing procedure was repeated 2 more times. Following the final wash with EPPS, BMBs were coated with peptides or antibodies as described below in parts (A) and (B), respectively, such that each peptide and antibody was combined with BMBs of a distinct barcode.

(A) Coating of BMBs with Peptides

Peptides (biochemical probes) capable of specifically binding a patients antibodies against *Anaplasma, Ehrlichia* or *Borrelia* (e.g., a peptide derived from a protein sequence of *Anaplasma phagocytophylum, Anaplasma platys, Ehrlichia canis, Ehrlichia ewingii*, or *Borrelia burgdorferi*, as described above) were synthesized with a cysteine linked to each peptide's N-terminus via a PEG12 linker as described above, except for the peptide derived from *Borrelia* which had an N-terminal cysteine, but no PEG linker. About 200 µL of an about 0.1 mM solution of each peptide was added to the tubes containing the EPPS-washed BMBs. The resulting suspension of BMBs was allowed to rotate end over end for about 2 hours at room temperature, protected from light. After this time, the tubes containing the BMBs were placed on the magnetic rack and the solvent removed by pipette. The BMBs were then washed with about 0.2 mL of a solution of about 1.8 mM sodium phosphate monobasic, about 8.4 mM sodium phosphate dibasic, about 145 nM sodium chloride, and about 0.05% Tween-20 with brief vortexing, followed by removal of the solvent. This process was repeated 2 times.

(B) Coating of BMBs with Antibody

About 200 µL of an antibody (biochemical probe), at a concentration of approximately 10 mg/mL (antibody concentration can range from about 1.5 mg/mL to about 12.0 mg/mL), capable of specifically binding antigen from heartworm (*Dirofilaria immitis*), as described above, circulating in the blood of an infected animal was added to the tubes containing the BMBs. The resulting suspension of BMBs was allowed to rotate end over end for about 2 hours at room temperature, protected from light. After this time, the tubes containing the BMBs were placed on the magnetic rack and the solvent removed by pipette. The BMBs were then washed with about 0.2 mL of a solution of about 1.8 mM sodium phosphate monobasic, about 8.4 mM sodium phosphate dibasic, about 145 nM sodium chloride, and about 0.05% Tween-20 with brief vortexing, followed by removal of the solvent. This process was repeated 2 times.

Assay

BMBs (65,000 BMBs/mL in assay buffer (1.0% BSA, 0.05% Tween, 0.05% Proclin 950, in PBS)) coated with the biomolecule probes described above in (A) or (B) were mixed to build a multiplex BMB mixture. The multiplex BMB mixture was further diluted in assay buffer to achieve a concentration of 500 BMB/mL of each biomolecule probe.

About 100 μL of this diluted multiplex BMB mixture was added to each well (i.e., about 50 beads per biomolecule probe) of a 96 well plate using an Integra automatic pipette (commercially available from Integra Biosciences Corp., Hudson, NH). The BMBs were washed 5 times with 300 μL of 0.05% Tween-20 in PBS on a 405-TS plate washer (commercially available from BioTek®, Winooski, VT) with a 10 second soak. After the final wash, excess supernatant (approximately 30 μL) was left on the plate after the final wash.

50 μL of sample (serum or plasma, neat) was added to the BMBs in each well on the 96 well plate. The plate was then placed on the plate mixer and mixed for 30 min at 1000 rpm. After the 30 minute incubation, the BMBs were washed with 300 μL of 0.05% Tween-20 in PBS with a 10 second soak.

50 μL of each biotinylated peptide (2.0 μg/mL, i.e., the same peptide that was used as the biomolecule probes) or biotinylated anti-heartworm antibody (1.0 μg/mL) in 1.0% BSA, 0.05% Tween, 0.05% Proclin 950, in PBS was added to each well of the 96 well plate. The plate was then placed on a plate mixer and mixed for 15 minutes. After the 15 minute incubation, the BMBs were washed with 300 μL of 0.05% Tween-20 in PBS with a 10 second soak.

50 μL of SA-PE, 8.0 μg/mL (commercially available from, MOSS Inc., Pasadena, MD catalog no. SAPERP01) was added to each well of the 96 well plate. The plate was then placed on a plate mixer and mixed for 10 minutes. After the 10 minute incubation, the BMBs were washed with 300 μL of 0.05% Tween-20 in PBS with a 10 second soak.

The resulting BMBs were than treated by either of two procedures.

In the first procedure, to each well of the 96 well plate was added:
(i) about 200 μL of a buffer (commercially available from Applied BioCode Inc., Santa Fe Springs, CA, catalog no. 44-D0004-500) (standard read buffer).

In the second procedure, to each well of the 96 well plate was added:
(ii) about 200 μL of a solution of a citrate buffer containing sodium citrate tribasic dihydrate (0.485 M), citric acid (0.015 M), sodium chloride (0.1 M), Proclin 950 (0.5 mL/L), pH 6.1-6.3 (citrate read buffer).

Ionic strength is an important factor that allows for stability of the immunocomplex formed on the surface of the beads. Without wishing to be bound by theory, it is believed that the stabilizing effect is due to the high salt concentration making the solution undesirable for disassociation. Salts, other than citrate salts, at high ionic strength also work, but they need to be at a minimum concentration of about 0.5M. Other salts, however, are not ideal for manufacturability or shipping because they fall out of solution at temperatures less than ambient temperature. Advantageously, the mix of citrate buffer remains in solution when stored or shipped at refrigerated conditions.

The fluorescence of each well was determined using a BioCode® 2500 Analyzer (commercially available from Applied BioCode Corp. of Santa Fe Springs, CA).

Figure 1:
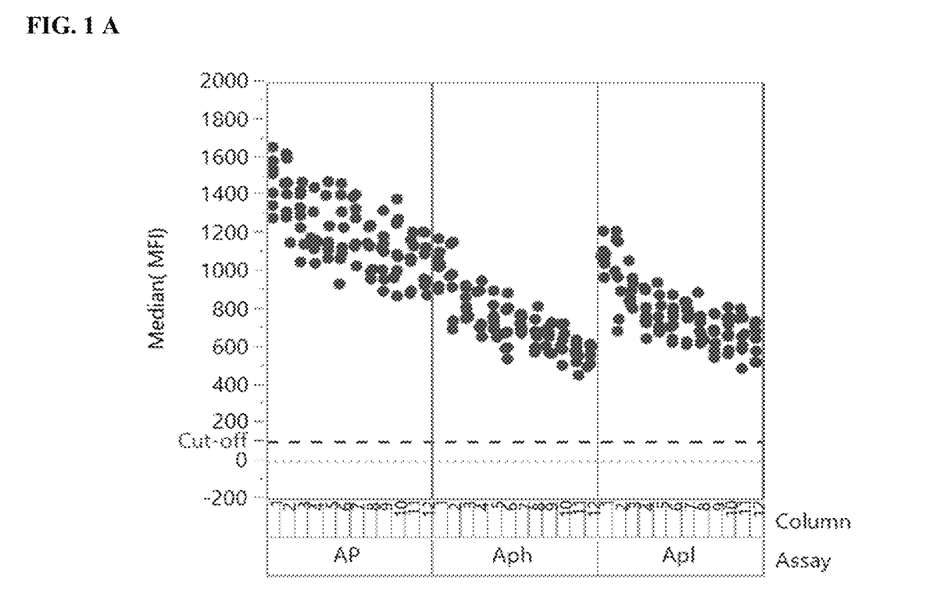
FIG. 1A and FIG. 1B are plots of signal strength as fluorescence intensity on BMBs measured as the single median result from all the beads in a well (MFI) vs. cell column position (i.e., 1-12) of a 96 well plate for an assay for antibodies specific for three *Anaplasma* derived peptides designated "AP", "Aph", and "Apl" as designated on the X axis of FIGS. 1A and 1B, as described in Example 6.

The fluorescent intensity of each sample in each well of the 96-well plate (i.e., a plate with 12 columns (1-12) and 8 rows (A-H)) was determined. FIG. 1 illustrates the signal strength observed using the standard read buffer containing (FIG. 1A) and using the citrate read buffer (FIG. 1B). In the experiment, each of the wells of a 96-well plate (i.e., a plate with 12 columns (1-12) and 8 rows (A-H)) were filled with identical BMBs (i.e., everything bound to the beads, as described above), and the signals were read from column 1 (i.e., wells 1A through 1H) to column 12 (i.e., wells 12A through 12H). The time to read the fluorescence in all of the cells of the 96 well plate (i.e., cells 1A to 12H) takes approximately 37 minutes. As can be seen in FIG. 1A, when the standard read buffer (which is buffer that does not contain citrate) is used, i.e., procedure (i), there is a gradual decrease in signal strength from the start of the read cycle to the end of the read cycle (approximately 37 minutes). In contrast, as can be seen in FIG. 1B, when the citrate read buffer is used, i.e., procedure (ii), no decrease in signal strength was observed from the start of the read cycle to the end of the read cycle (approximately 37 minutes). This decrease in signal intensity during the read cycle when using a non-citrate-containing buffer, such as the standard read buffer, but not when using a citrate-containing buffer, such as the citrate read buffer, occurred in an assay for antibodies specific for each of three *Anaplasma* derived peptides designated "AP", "Aph", and "Apl" on the X axis of FIG. 1A and FIG. 1B.

FIG. 1 shows that contacting the BMBs with a citrate buffer before reading the fluorescence advantageously avoids a decrease in fluorescence as a function of time compared to other buffers.

Similar effects of standard and citrate read buffer on signal strength as a function of time was observed in the assays for antibodies specific for peptides derived from *Ehrlichia canis, Ehrlichia ewingii*, and in the assay for *Borrelia burgdorferi* (not shown).

The entire disclosure of all references that have been cited are incorporated herein by reference.

What is claimed is:

1. A method of making a substrate for biological analysis comprising:
   (i) providing a substrate that has a surface comprising an epoxy-based resin and
   (ii) contacting a biomolecule probe with the substrate that has a surface comprising an epoxy-based resin so that the biomolecule probe bonds directly to the epoxy-based resin;
   wherein the substrate that has a surface comprising an epoxy-based resin is washed with dimethylsulfoxide (DMSO) before the biomolecule probe is contacted with the substrate that has a surface comprising an epoxy-based resin.

2. The method of claim 1, wherein the biomolecule probe is selected from the group consisting of lipids, polysaccharides, amino acids, polypeptides, oligopeptides, peptides, antibodies and fragments thereof, polynucleotides, oligonucleotides, aptamers, lectins, avidin, streptavidin, biotin, and polyethylene glycol.

3. The method of claim 2, wherein the biomolecule probe is an antibody.

4. The method of claim 1, wherein the substrate that has a surface comprising an epoxy-based resin is selected from the group consisting of a film, a microbead; a microparticle;

a micro pellet; a micro wafer; a paramagnetic bead; a microparticle containing a bar code; a paramagnetic microparticle; a microparticle containing a bar code; a paramagnetic microparticle containing a bar code; and a bead containing a nickel bar code.

5. The method of claim 1, wherein the biomolecule probe is contacted with the epoxy-based resin by contacting the substrate that has a surface comprising an epoxy-based resin with a solution of the biomolecule probe to provide a contact mixture.

6. The method of claim 5, wherein the solution is an aqueous solution.

7. The method of claim 6, wherein the aqueous solution is buffered with about 100 mM 2-(N-morpholino) ethanesulfonic acid (MES) and about 140 mM Guanidine-HCl at a pH of about 5.5.

8. The method of claim 6, wherein the aqueous solution is buffered with about 100 mM 4-(2-Hydroxyethyl)-1-piperazinepropanesulfonic acid (EPPS) and 140 mM Guanidine-HCl at a pH of about 8.

9. The method of claim 5, wherein the solution of the biomolecule probe is a dimethyl sulfoxide (DMSO) solution.

10. The method of claim 9, wherein the DMSO solution contains about 1% polysorbate 20.

11. The method of claim 5, wherein the biomolecule probe is present in the solution of the biomolecule probe at a concentration ranging from about 0.05 mg/mL to about 5 mg/mL.

12. The method of claim 5, wherein the substrate that has a surface comprising an epoxy-based resin is present in the contact mixture at a concentration ranging from about 0.05 to about 5.0 million substrates/mL.

13. The method of claim 1, wherein the biomolecule probe is contacted with the substrate that has a surface comprising an epoxy-based resin for at least about 4 hours.

14. The method of claim 13, wherein the biomolecule probe is contacted with the substrate that has a surface comprising an epoxy-based resin for between about 4 hours and about 18 hours.

15. The method of claim 5, wherein the contact mixture is maintained at a temperature of between about 15° C. and about 30° C.

16. The method of claim 1, wherein the DMSO contains about 1% polysorbate 20.

17. A substrate for biological analysis prepared by the method of claim 1.

18. The method of claim 3, wherein the antibody is selected from the group consisting of an antibody that specifically binds a coproantigen from roundworm, an antibody that specifically binds a coproantigen from whipworm, an antibody that specifically binds a coproantigen from hookworm, an antibody that specifically binds a coproantigen from tapeworm, an antibody that specifically binds an antigen from heartworm, and an antibody that specifically binds a coproantigen from *Giardia*.

19. The method of claim 2, wherein the biomolecule probe is a protein expressed by an infectious agent, part of the protein expressed by the infectious agent, a peptide or recombinant protein derived from a protein expressed by an infectious agent, or a variant of the protein expressed by the infectious agent.

20. The method of claim 19, wherein the biomolecule probe can specifically bind an antibody generated by a subject against bacteria from a genus selected from the group consisting of *Ehrlichia, Anaplasma*, and *Borrelia*.

21. The method of claim 20, wherein the biomolecule probe can specifically bind an antibody generated by the subject against bacteria selected from the group consisting of *Ehrlichia canis, Ehrlichia chaffeensis, Ehrlichia ewingii, Anaplasma phagocytophylum, Anaplasma platys*, and *Borrelia burgdorferi*.

22. The method of claim 19, wherein the biomolecule probe can specifically bind an antibody generated by a subject against *Dirofilaria immitis*.

23. The method of claim 3, wherein the biomolecule probe is an antibody that specifically binds an antigen of *Dirofilaria immitis*.

24. The method of claim 19, wherein the biomolecule probe can specifically bind an antibody against a metabolite.

25. The method of claim 24, wherein the metabolite is symmetrical dimethly arginine (SDMA).

26. The method of claim 1, wherein the substrate that has a surface comprising an epoxy-based resin is not contacted with any other solution after it is washed with dimethylsulfoxide (DMSO) and before it is contacted with the biomolecule probe.

* * * * *